(No Model.) 2 Sheets—Sheet 2.
F. MYERS.
VEHICLE WHEEL.
No. 528,887. Patented Nov. 6, 1894.
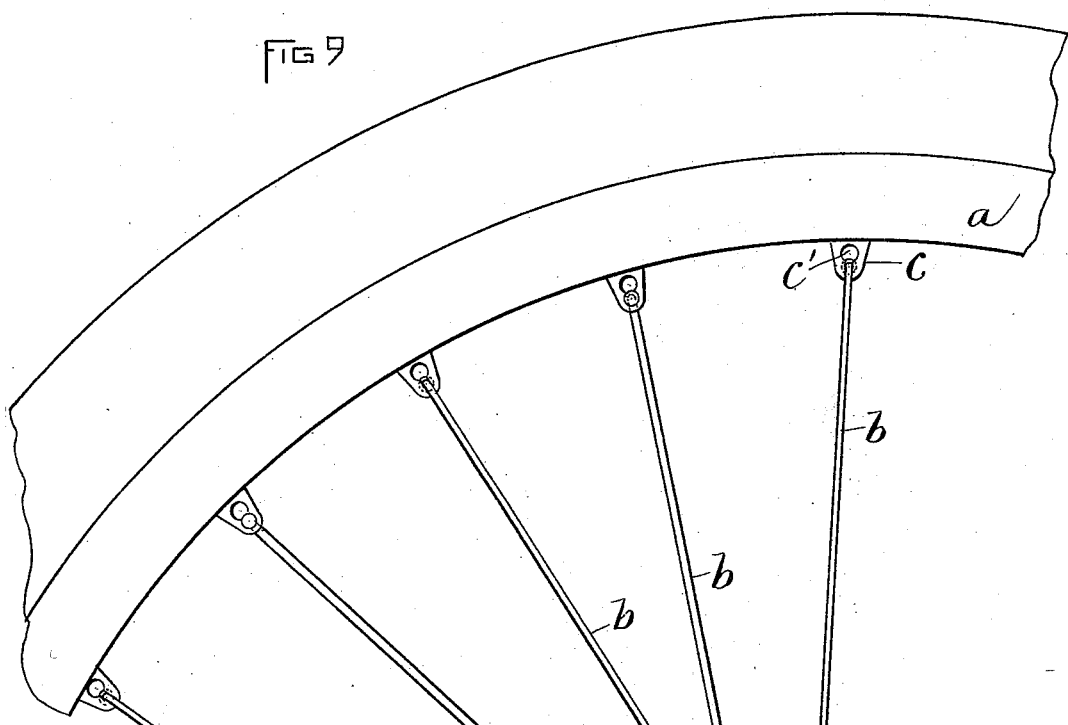
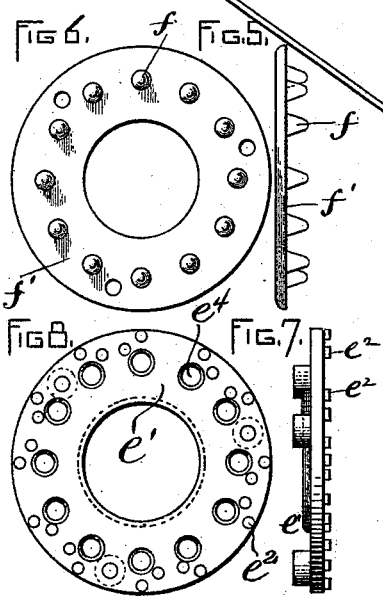
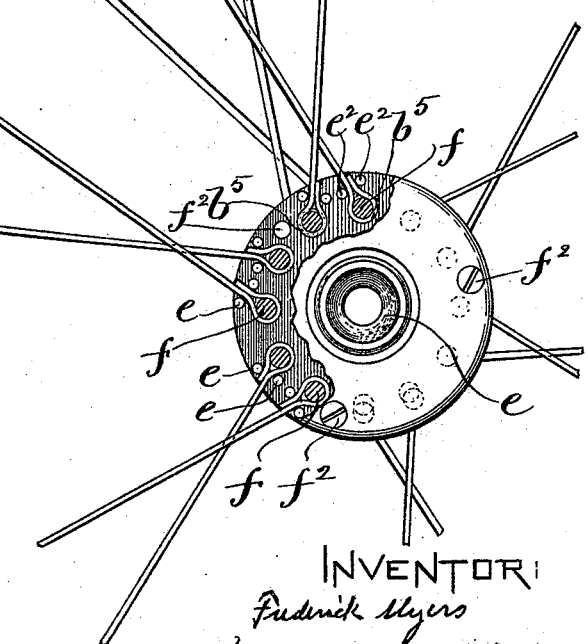
WITNESSES:
H. P. Brown
Rollin Abell.
INVENTOR:
Frederick Myers
by Wright, Brown & Quinby
Attys.
THE NORRIS PETERS CO., PHOTO-LITHO., WASHINGTON, D. C.

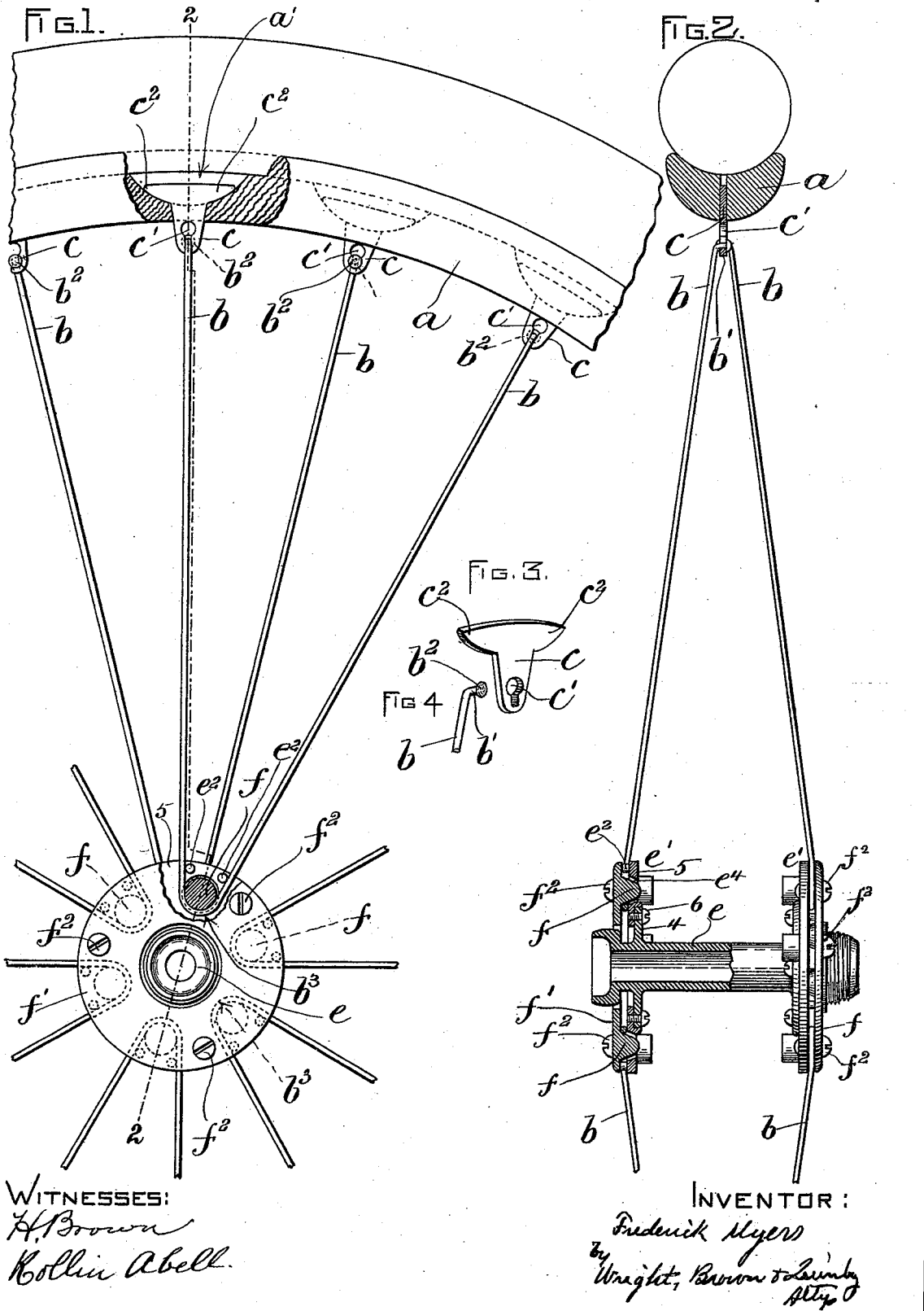

UNITED STATES PATENT OFFICE.

FREDERICK MYERS, OF NEW YORK, N. Y., ASSIGNOR TO THE MYERS MANUFACTURING COMPANY, OF SAME PLACE.

VEHICLE-WHEEL.

SPECIFICATION forming part of Letters Patent No. 528,887, dated November 6, 1894.

Application filed August 25, 1894. Serial No. 521,323. (No model.)

*To all whom it may concern:*

Be it known that I, FREDERICK MYERS, of New York, in the county of New York and State of New York, have invented certain new and useful Improvements in Vehicle-Wheels, of which the following is a specification.

This invention relates to that class of wheels in which light spokes are used under tension, or as in the common bicycle wheel.

My invention has for its object to provide improved means for the exertion of a simultaneous as well as a uniform strain upon the spokes in such manner as to enable the wheel to be quickly and economically put together and trued up, and to provide a construction which will enable the spokes to be readily removed and replaced without disturbing the tire of the wheel; and to this end the invention consists in the improvements which I will now proceed to describe and claim.

Of the accompanying drawings, forming a part of this specification,—Figure 1 represents a side elevation, partially in section, showing a portion of a wheel embodying my invention. Fig. 2 represents a section on line 2—2 of Fig. 1. Figs. 3 and 4 represent perspective views of details hereinafter referred to. Figs. 5 and 6 represent respectively edge and side views of one form of the spoke-straining device on the hub of the wheel. Figs. 7 and 8 represent respectively an edge and side view of the flange on the hub which co-operates with the device shown in Figs. 5 and 6. Fig. 9 represents a side view, showing the spokes made independently.

The same letters and numerals of reference indicate the same parts in all the figures.

In the drawings—$a$ represents the wheel-rim, which is of the continuous type used in tension wheels of this class, and may be made of any suitable material, such as wood or metal. The rim is provided with a series of devices to engage the outer ends of a series of wire spokes $b$, said devices being preferably of such nature that the spokes can be detachably engaged with them at points within the rim, and can therefore be connected with and detached from the rim without disturbing the tire or removing the engaging device. Said engaging devices are here shown as ears or loops $c$ having orifices $c'$ the inner ends of which constitute seats which support the outer ends of the spokes against inward movement, the spokes having bearings $b'$ at their outer ends formed to rest on said seats. The ears or loops $c$ are preferably provided with arms or wings $c^2 c^2$ which are seated on the bottoms of slots $a'$ (Fig. 1) formed in the rim $a$, the ears passing through continuations of said slots and projecting through the rim.

The outer bearings $b'$ on the spokes are or may be the under sides of necks formed by bending the spokes laterally, said necks terminating in enlargements or heads $b^2$ which are adapted to pass through the enlarged inner portions of the slots $c'$ and engage the walls of the contracted outer portions thereof, the slots being of key-hole shape. This construction affords a substantial and convenient means of detachably connecting the spokes with the rim. I do not limit myself, however, to these devices, and may connect the spokes to the rim in any other desired manner; but in all cases, the spoke-engaging devices on the rim are fixed against movement toward the center of the wheel.

I prefer to make the spokes in the form shown in Fig. 1, each spoke being formed of the same piece of wire with another spoke, the two being connected by a loop $b^3$ which constitutes an inner bearing. If desired, however, each spoke may be made of an independent piece, in which case its inner end will be bent into a smaller loop or eye, one side of which will constitute the inner bearing. Said outer and inner bearings are located at fixed distances apart, said distances being predetermined and preferably uniform throughout all the spokes.

$e$ represents the hub, which is provided with a connected series of seats adapted to engage the inner bearings or loops of the spokes and to put the spokes under tension, or in other words, strain the spokes. Said seats are studs $f$ which are here shown as adjustably connected to fixed flanges $e'$ on the hub $e$ and enter the inner bearings on the spokes. Said studs are formed to present inclined surfaces to the said bearings, so that when the studs are moved into the bearings they will act as wedges moving lengthwise of the axis of the wheel and exerting an inward pressure on the bearings. For the sake of convenience, I make said studs conical. The studs $f$ are connected in a series, so that they may be caused to simultaneously strain the spokes. To this end, in the construction here shown, I form the said studs $f$ on a ring or annular plate $f'$, which is or may be adjustably connected to the flange $e'$ by means of screws $f^2$, and constitutes an adjustable flange. The fixed flange $e'$ laterally supports the inner ends of the spokes, as shown in Fig. 2. When the screws $f^2$ are adjusted to move the adjustable flange $f'$ toward the fixed flange $e'$, the studs $f$ are forced into the loops of the spokes, their inclined surfaces exerting a wedge-like action upon the said loops and thus straining the spokes. It will be observed that all the studs $f$ are moved simultaneously by the adjustment of the flange $f'$, as said studs are arranged so that when they are adjusted to their spoke-straining position they are at a fixed or predetermined distance from the seats on the wheel-rim, said distance corresponding with the distance between the outer and inner bearings of the spokes. It follows that the adjustment of the studs $f$ will exert a predetermined tension or strain upon all the spokes, so that the spokes will be uniformly strained and the wheel given its proper tension by the act of adjusting the said studs.

The degree of strain or tension exerted on the spokes may be varied by the adjustment of the flange $f'$, the taper of the studs, and the length of the screws $f^2$ being such that any desired degree of strain or tension may be imparted by the conjoint action of said parts.

For the sake of convenience of construction, the fixed flange $e'$ on the hub $e$ is made in two sections 4 and 5, the inner section 4 being formed integral with the body of the hub, while the outer section 5 is a ring which is attached by screws 6 to the section 5.

It is obvious that the studs $f$ may be formed on or attached to the fixed hub flange $e'$ instead of being formed on the adjustable flange $f'$, in which case said adjustable flange would have holes to receive the said studs, and would act to press the loops of the spokes onto the studs instead of pressing the studs into the said loops, the adjustable flange being connected to the hub flanges by the screws $f^2$ as in the construction illustrated. This modification would be simply a reversal of the location of the studs and holes, and would involve no departure from the spirit of the invention.

The flange $e'$ may be provided with a series of fixed pins or projections $e^2$ which are arranged in pairs, each pair of pins being located so that their inner sides will bear against the outer surface of the loop or eye formed on the inner end of the single spoke, and serve as a means for temporarily securing the inner ends of the spokes to the flange before the studs $f$ have been moved to their spoke-straining position. Said pins $e^2$ hold the inner ends of the spokes in position to receive the studs $f$, the latter in being adjusted drawing the loops of the spokes inwardly, as already described. The flange $e'$ is preferably provided with orifices $e^4$ formed and arranged to receive the studs $f$, as shown in Fig. 2.

In Fig. 9 I show a wheel having the independent spokes above referred to, each spoke being made of a single piece of wire and having a contracted eye or loop $b^5$ at its inner end engaged with one of the studs $f$. The spokes are here shown as tangentially arranged; but they may be radially arranged, if preferred.

Owing to the construction whereby the entire series of spokes either side of the wheel may be simultaneously strained independently of the other series, the rim may be readily brought to and held in a plane midway of the ends of the hub.

I claim—

1. In a wheel, the combination of a rim, two series of spokes engaged at their outer ends with the rim and having loops at their inner ends, and a hub provided with two independent spoke-straining devices whereby either series of spokes may be strained independently of the other, each straining device comprising a fixed flange and an adjustable flange between which the loops of a series of spokes are interposed, one flange having a series of studs which enter the spoke-loops and have inclined inner sides, while the other flange co-operates with said studs in straining the spokes engaged therewith, as set forth.

2. In a wheel, the combination of a rim, spokes engaged at their outer ends with the rim and provided with loops at their inner ends, a hub having a fixed flange and an adjustable flange between which said loops are interposed, one of said flanges having a series of integral wedge-shaped studs in adjustable contact with the said loops and the other a series of aperatures coinciding with said studs, and means for variably adjusting one of said flanges to simultaneously and uniformly strain the spokes.

3. In combination with the rim $a$ provided with slots $a'$, the spokes $b$, the hub $e$, and the conical studs or seats $f$, the ears $c$ supported in said slots and having at their inner ends keyhole-shaped eyes $c'$ to serve as bearings for the spokes, substantially as described.

In testimony whereof I have signed my name to this specification, in the presence of two subscribing witnesses, this 21st day of August, A. D. 1894.

FREDERICK MYERS.

Witnesses:
JOSIAH QUINCY,
CHARLES F. BROWN.